United States Patent [19]

Hiraoka

[11] Patent Number: 5,482,993
[45] Date of Patent: Jan. 9, 1996

[54] RUBBER COMPOSITION SUITABLE FOR GRIPS OF ARTICLES AND GRIP MADE THEREOF

[75] Inventor: Hidenori Hiraoka, Kobe, Japan

[73] Assignee: Sumitomo Rubber Industries, Ltd., Hyogo, Japan

[21] Appl. No.: 386,181

[22] Filed: Feb. 9, 1995

Related U.S. Application Data

[63] Continuation of Ser. No. 63,545, May 19, 1993, abandoned.

[30] Foreign Application Priority Data

May 20, 1992 [JP] Japan ..................... 4-154484

[51] Int. Cl.$^6$ .............. C08L 23/16; C08L 9/00; C08F 132/04
[52] U.S. Cl. .......... 524/189; 525/211; 525/216; 525/232
[58] Field of Search .................. 525/211, 216, 525/232; 524/789

[56] References Cited

U.S. PATENT DOCUMENTS

| | | | |
|---|---|---|---|
| 3,816,358 | 6/1974 | Nordsiek et al. | 525/216 |
| 4,048,262 | 9/1977 | Haag | 200/889 |
| 4,153,772 | 5/1979 | Schwesig | 526/308 |
| 4,849,478 | 7/1989 | Mori | 525/211 |
| 4,898,223 | 2/1990 | Botzman | 152/547 |

OTHER PUBLICATIONS

Rubber Technology, M. Morton, VNR, New York, 1987, pp. 90–93.

Primary Examiner—Joseph L. Schofer
Assistant Examiner—I. Zemel
Attorney, Agent, or Firm—Antonelli, Terry, Stout & Kraus

[57] ABSTRACT

A rubber composition suitable for use in grips of articles such as golf clubs, tennis rackets, bicycles and tools, comprising (1) a rubber component containing a blend of an ethylene-propylene-diene rubber (EPDM) and natural rubber, (2) 2 to 40 parts by weight of a transpolyoctenamer per 100 parts by weight of the rubber blend, and (3) a filler containing a hydrated aluminum silicate powder, which provides grips having good non-slipping property, good feeling of touch and good response to mis-shot of golf balls.

12 Claims, No Drawings

RUBBER COMPOSITION SUITABLE FOR GRIPS OF ARTICLES AND GRIP MADE THEREOF

This application is a continuation of Ser. No. 08/063,545, filed May 19, 1993, now abandoned.

BACKGROUND OF THE INVENTION

The present invention relates to a rubber composition suitable for use in various grips, e.g., grips of golf clubs, grips of tennis rackets, grips to be attached to handlebars of bicycles, motorcycles or cultivators, and grips to be attached to tools such as hammers, and also relates to a grip prepared from the composition.

In general, as the properties to be required for grips, it is important that they are not slippery and have a good feeling of touch. In case of grips of golf clubs, it is also one of important properties required that they give a good response to mis-shot.

Grips which have been conventionally used are those made of leathers or those made of rubbers, for example, those made from rubber compositions containing, as a base rubber, natural rubber alone or a blend of natural rubber and a styrene-butadiene rubber, and a filler such as silicon oxide, carbon or magnesium carbonate.

However, these grips only satisfies the non-slipping requirement to some extent, and the feeling of touch and the response to mis-shot are not always satisfactory.

For example, grips made of leathers have a good feeling of touch. However, if they once get wet as a result of use in a rainy day, hardening of leathers is marked and the grips lose their original good feeling of touch, thus resulting in very poor feeling of touch. Grips made from rubber compositions containing natural rubber or a blend of natural rubber and SBR deteriorate with the lapse of time. Thus, the feeling of touch and the response to mis-shot become worse, and the abrasion resistance is also decreased.

It is an object of the present invention to provide a rubber composition suitable for preparing grips used in various articles.

Another object of the present invention is to provide grips having a good non-slipping property, a good feeling of touch and a good response to mis-shot of golf balls.

These and other objects of the present invention will become apparent from the description hereinafter.

SUMMARY OF THE INVENTION

In accordance with the present invention, there is provided a rubber composition suitable for use in grips of articles, which comprises (1) a rubber component containing a blend of an ethylene-propylene-diene rubber (EPDM) and natural rubber, (2) 2 to 40 parts by weight of a trans-polyoctenamer per 100 parts by weight of the blend, and (3) a filler containing a hydrated aluminum silicate powder.

DETAILED DESCRIPTION

A blend of EPDM and natural rubber is used as a base rubber in the present invention. EPDM serves mainly to raise the nonslipping property and also to raise the ozone cracking resistance. On the other hand, natural rubber provides proper hardness and elasticity, and as a result, serves to raise the feeling of touch.

The ratio of EPDM to natural rubber in the base rubber component is from 10:90 to 90:10 by weight, preferably 30:70 to 80:20 by weight. When the proportion of EPDM in the base rubber component is less than the above range, the aging resistance such as resistance to ozone cracking is decreased and also grips become easy to slip. When the proportion of EPDM is more than the above range, the feeling of touch becomes bad.

EPDM rubbers used in the present invention are not particularly limited, and known ethylene-propylene-diene rubbers (EPDM) can be used. It is preferable to select EPDM rubbers having a relatively high vulcanizing rate which are easy to be covulcanized with natural rubber, namely EPDM rubbers having a relatively high iodine value. Representative examples of commercially available preferable EPDM rubbers are, for instance, KELTAN 514 (trade mark, product of DSM Elastomers Co., Ltd.), ESPRENE 505 and ESPRENE 505A (trade mark, products of Sumitomo Chemical Co., Ltd.), and the like.

The trans-polyoctenamer serves to improve the compatibility between EPDM and natural rubber in blending them, thus stabilizing the physical properties of grips. It also serves to improve the feeling of touch.

The trans-polyoctenamer is a polymer prepared from cyclooctene. Cyclooctene is synthesized from 1,3-butadiene through 1,5-cyclooctadiene.

The trans-polyoctenamer can be prepared by metathesis polymerization of cyclooctene which produces a polyoctenamer and finally provides a mixture of linear and cyclic macromolecules. The metathesis polymerization is carried out according to a known method.

The trans-polyoctenamer is also commercially available. For example, it is commercially available under the trade mark "VESTENAMER" from Hüls AG. Representative examples of such commercial products usable in the present invention are, for example, VESTENAMER 8012 (trans content about 80%, melting point about 54° C.) and VESTENAMER 6213 (trans content about 60%, melting point about 30° C.).

The trans-polyoctenamer having a molecular weight of 50,000 to 200,000 (as measured by GPC), a trans content of at least 50% and a degree of crystallization of 5 to 50% (as measured by DSC secondary fusion) are usually employed in the present invention.

The trans-polyoctenamer is used in an amount of 2 to 40 parts by weight, preferably 5 to 30 parts by weight, per 100 parts by weight of the base rubber, namely a blend of EPDM and natural rubber. When the amount of the trans-polyoctenamer is less than 2 parts by weight per 100 parts by weight of the base rubber, no satisfactory effects are obtained. When the amount is more than 40 parts by weight, the non-slipping property lowers in the summer season or in a high temperature atmosphere because the trans-polyoctenamer has a temperature dependency.

It is essential to use a blend of EPDM and natural rubber as a base rubber, but the rubber component included in the composition may contain other rubbers than the base rubber, as occasion demands. Examples of other rubbers are, for instance, isoprene rubber, butadiene rubber, styrene-butadiene rubber, chloroprene rubber, butyl rubber, ethylene-propylene rubber, and acrylonitrile rubber. The amount of the other rubbers is at most 40 by weight of the whole rubber component (total of the base rubber and other rubbers).

A hydrated aluminum silicate powder is used as an essential component of the filler in the present invention. It has a proper degree of reinforcing ability and contributes to improvement of the feeling of touch of grips.

It is preferable to use a hydrated aluminum silicate powder such that the proportion of the particles having a particle size of not more than 15 μm is at least 70% and the $Al_2O_3/SiO_2$ ratio is from 15/85 to 60/40 by weight. Such a hydrated aluminum silicate powder is put on the market, and is commercially available, for example, under the trade marks O.A Clay and H.A Clay from Maruo Calcium Co., Ltd., and Crown Clay from Southeastern Clay Company.

The hydrated aluminum silicate powder is used in an amount of 5 to 80 parts by weight, preferably 10 to 40 parts by weight, per 100 parts by weight of the rubber component comprising the base rubber. When the amount of the hydrated aluminum silicate powder is less than 5 parts by weight, its reinforcing effect and effect of improving the feeling of touch are not sufficiently exhibited. The use in an mount of more than 80 parts by weight is not desirable since the weight of grips becomes too large.

The term "rubber component" as used herein means the base rubber or a combination of the base rubber and other rubbers as mentioned above.

The hydrated aluminum silicate powder may be used alone as the filler for the rubber composition, or in combination with other filler materials.

Examples of other fillers used optionally with the hydrated aluminum silicate are, for example, a metal carbonate such as magnesium carbonate, barium carbonate, calcium carbonate or strontium carbonate, barium sulfate, calcium oxide, silicon oxide, white carbon, and other inorganic or organic fillers generally used rubber in compositions. One or more of these fillers are used in an amount of 5 to 80 parts by weight, especially 4 to 40 parts by weight, per 100 parts by weight of the rubber component.

Any of curing agents usually employed for vulcanization of rubbers can be employed in the present invention, e.g., organic peroxides, sulfur and organic sulfur compounds. The amount of the curing agent is from 0.1 to 15 parts by weight, preferably 0.3 to 5 parts by weight, per 100 parts by weight of the rubber component.

Any of curing accelerators usually employed for vulcanization of rubbers can be employed in the present invention, e.g., aldehyde ammonia compounds, sulfenamide compounds, benzothiazole compounds, thiuram compounds, dithiocarbamate compounds, guanidine compounds and thiourea compounds. The amount of the curing accelerator is from 0.2 to 10 parts by weight, preferably 0.2 to 5 parts by weight, per 100 parts by weight of the rubber component.

Zinc oxide and stearic acid may be optionally used as an activator. The amount of zinc oxide is from 3 to 10 parts by weight per 100 parts by weight of the rubber component. The amount of stearic acid is from 0.5 to 3 parts by weight per 100 parts by weight of the rubber component.

Softeners or plasticizers may be optionally incorporated in the rubber composition according to the present invention. Any of softeners or plasticizers usually employed in the preparation of rubber compositions can be employed in the present invention, e.g., paraffin oil, aromatic oil, naphthenic oil and other vegetable or mineral oils. The amount of the softener or plasticizer is at most 50 parts by weight, preferably from 5 to 20 parts by weight, per 100 parts by weight of the rubber component.

The rubber composition according to the present invention may contain other usual additives, e.g., carbon black and antioxident.

Kneading for preparing the rubber composition according to the present invention can be made by a suitable mixing machine such as a roll mixer, a Banbury mixer or a kneader. Components other than the curing agent and the curing accelerator may be previously mixed, and the curing agent and the curing accelerator be then added thereto and mixed on rolls. A blend of EPDM and natural rubber is used as the base rubber in the present invention, but it is not required to previously blend EPDM with natural rubber, and these rubbers may be kneaded together with other components. That is to say, it is sufficient that EPDM and natural rubber are only present in the blended state with other components in the rubber composition for grips.

The rubber composition is filled in a suitable mold and is cured, for example, by heating at a temperature of 155° to 175° C. for 2 to 10 minutes under a pressure.

Grips obtained from the rubber composition according to the present invention may be subjected to buffing by means of a sand paper in order to improve the non-slipping property or the feeling of touch.

The present invention is more specifically described and explained by means of the following Examples, in which all parts are by weight unless otherwise noted.

It is to be understood that the present invention is not limited to the Examples.

EXAMPLES 1 TO 4 AND COMPARATIVE EXAMPLES 1 TO 3

Rubber compositions for grips were prepared according to the recipes shown in Table 1, filled in a mold and cured at 170° C. for 5 minutes under a pressure of 60 kg/cm². Unnecessary portions on the surface of the cured products were cut off and the surface was buffed with a #100 sand paper to give grips for golf club.

TABLE 1

| Ingredients (part) | Ex. 1 | Ex. 2 | Ex. 3 | Ex. 4 | Com. Ex. 1 | Com. Ex. 2 | Com. Ex. 3 |
|---|---|---|---|---|---|---|---|
| Natural rubber*[1] | 60 | 60 | 40 | 40 | 70 | 100 | 60 |
| EPDM*[2] | 40 | 40 | 40 | 40 | — | — | 40 |
| SBR*[3] | — | — | — | — | 30 | — | — |
| VESTENAMER 8012*[4] | 15 | — | 20 | — | — | — | 65 |
| VESTENAMER 6213*[5] | — | 15 | — | 20 | — | — | — |
| Hydrated aluminum silicate*[6] | 30 | 30 | 30 | 30 | — | 30 | 30 |
| White carbon | — | — | — | — | 30 | — | — |
| Naphthenic oil (softener) | 10 | 10 | 10 | 10 | 20 | 10 | 10 |
| Zinc oxide | 5 | 5 | 5 | 5 | 5 | 5 | 5 |
| Stearic acid | 1 | 1 | 1 | 1 | 1 | 1 | 1 |

TABLE 1-continued

| Ingredients (part) | Ex. 1 | Ex. 2 | Ex. 3 | Ex. 4 | Com. Ex. 1 | Com. Ex. 2 | Com. Ex. 3 |
|---|---|---|---|---|---|---|---|
| Antioxidant*[7] | 0.5 | 0.5 | 0.5 | 0.5 | 0.5 | 0.5 | 0.5 |
| Carbon black | 5 | 5 | 5 | 5 | 5 | 5 | 5 |
| Sulfur | 1.5 | 1.5 | 1.5 | 1.5 | 2.0 | 2.0 | 1.5 |
| Accelerator CZ*[8] | 1.0 | 1.0 | 1.0 | 1.0 | 1.0 | 1.0 | 1.0 |
| Accelerator TT*[9] | 0.5 | 0.5 | 0.5 | 0.5 | 1.0 | 1.0 | 1.0 |

(Notes)
*[1]RSS #3 (natural rubber #3)
*[2]Ethylene-propylene-diene rubber made by Sumitomo Chemical Co., Ltd. (trade mark "ESPRENE 505A")
*[3]SBR1502 (styrene-butadiene rubber made by Japan Synthetic Rubber Co., Ltd.
*[4]Trade mark, Trans-polyoctenamer made by Hüls AG (trans content: about 80%)
*[5]Trade mark, Trans-polyoctenamer made by Hüls AG (trans content: about 60%)
*[6]Crown clay made by Southeastern Clay Company
*[7]Alkylphenol antioxidant made by Ohuchi Shinko Kagaku Kogyo Kabushiki Kaisha (trade mark "Nocrac NS-6")
*[8]N-Cyclohexyl-2-benzothiazylsulfenamide
*[9]Tetramethylthiuram disulfide Each of the obtained grips was attached to a wood #1 golf club, and was estimated by 200 persons including professional golfers with respect to nonslipping property, feeling of touch and response to mis-shot. The estimation was made in three ratings, "good", "ordinary" and "bad". The results of the estimation are shown by the number of estimators for each rating in Table 2.

TABLE 2

| | Ex. 1 | Ex. 2 | Ex. 3 | Ex. 4 | Com. Ex. 1 | Com. Ex. 2 | Com. Ex. 3 |
|---|---|---|---|---|---|---|---|
| Non-slippling property | | | | | | | |
| Good | 191 | 183 | 161 | 186 | 0 | 0 | 3 |
| Ordinary | 9 | 17 | 39 | 14 | 8 | 11 | 15 |
| Bad | 0 | 0 | 0 | 0 | 192 | 189 | 182 |
| Feeling of touch | | | | | | | |
| Good | 172 | 185 | 181 | 195 | 10 | 23 | 2 |
| Ordinary | 28 | 15 | 19 | 5 | 49 | 23 | 14 |
| Bad | 0 | 0 | 0 | 0 | 141 | 154 | 184 |
| Response to mis-shot | | | | | | | |
| Good | 149 | 162 | 183 | 132 | 2 | 5 | 3 |
| Ordinary | 50 | 37 | 17 | 67 | 47 | 54 | 51 |
| Bad | 1 | 1 | 0 | 1 | 151 | 141 | 146 |

It is observed in Table 2 that for the grips of Examples 1 to 4 according to the present invention, an overwhelming majority of the persons have estimated as good with respect to all of non-slipping property, feeling of touch and response to mis-shot, whereas for the grips of Comparative Examples 1 to 3, an overwhelming majority of the persons have estimated as bad with respect to all of non-slipping property, feeling of touch and response to mis-shot.

It would be understood that the rubber compositions according to the present invention which contain a blend of EPDM and natural rubber as an essential rubber component, a specific amount of a transpolyoctenamer based on the blend, and a hydrated aluminum silicate powder as an essential filler component, provide grip materials having good properties such as non-slipping property, feeling of touch and response to mis-shot. In contrast, the grip of Comparative Example 1 containing a blend of natural rubber and SBR as the rubber component and not containing trans-polyoctenamer and hydrated aluminum silicate filler, the grip of Comparative Example 2 containing natural rubber alone as the rubber component and containing no hydrated aluminum silicate filler, and the grip of Comparative Example 3 containing transpolyoctenamer excessively as compared to those of Examples 1 to 4 are all poor in non-slipping property, feeling of touch and response to mis-shot.

In addition to the ingredients used in the Examples, other ingredients can be used in the Examples as set forth in the specification to obtain substantially the same results.

What is claimed is:

1. A rubber composition suitable for use in grips of articles, which comprises (1) a rubber component, said rubber component being a blend of an ethylene-propylene-diene rubber and a natural rubber wherein the ratio of ethylene-propylene-diene rubber to the natural rubber is from 30:70 to 80:20 by weight, (2) 2 to 40 parts by weight of a trans-polyoctenamer per 100 parts by weight of said blend, and (3) 5 to 80 parts by weight of a filler containing a hydrated aluminum silicate powder per 100 parts by weight of said rubber component.

2. The composition of claim 1, wherein said trans-polyoctenamer has a trans content of at least 50%.

3. The composition of claim 1, wherein said trans-polyoctenamer has a degree of crystallization of 5 to 50%.

4. The composition of claim 1, wherein said trans-polyoctenamer has a trans content of about 80% and a melting point of about 54° C.

5. The composition of claim 1, wherein said trans-polyoctenamer has a trans content of about 60% and a melting point of about 30° C.

6. The composition of claim 1, wherein at least 70% of said hydrated aluminum silicate powder has a particle size of not more than 15 μm.

7. The composition of claim 1, wherein said hydrated aluminum silicate powder has an $Al_2O_3/SiO_2$ ratio of 15/85 to 60/40 by weight.

8. The composition of claim 1, wherein said filler contains 5 to 80 parts by weight of a hydrated aluminum silicate powder and at most 80 parts by weight of other inorganic fillers per 100 parts by weight of said rubber component.

9. The composition of claim 1, which comprises said components (1), (2) and (3), 0.1 to 15 parts of a curing agent, 0.2 to 10 parts of a curing accelerator, and at most 50 parts of a softener or a plasticizer, said parts being parts by weight per 100 parts by weight of said rubber component (1).

10. A grip made of a rubber composition comprising (1) a rubber component, said rubber component being of a blend of an ethylene-propylene-diene rubber and a natural rubber wherein the ratio of ethylene-propylene-diene rubber to the natural rubber is from 30:70 to 80:20 by weight, (2) 2 to 40 parts by weight of a transpolyoctenamer per 100 parts by weight of said blend, and (3) 5 to 80 parts by weight of a filler containing a hydrated aluminum silicate powder per 100 parts by weight of said rubber component.

11. The grip of claim 10, wherein at least 70% of said hydrated aluminum silicate powder has a particle size of not more than 15 μm.

12. The grip of claim 15, wherein said filler contains 5 to 80 parts by weight of a hydrated aluminum silicate powder and at most 80 parts by weight of other inorganic fillers per 100 parts by weight of said rubber component.

\* \* \* \* \*